July 7, 1959
B. F. MEYER
2,893,258
MECHANICAL MOVEMENT DEVICE
Filed Nov. 16, 1956
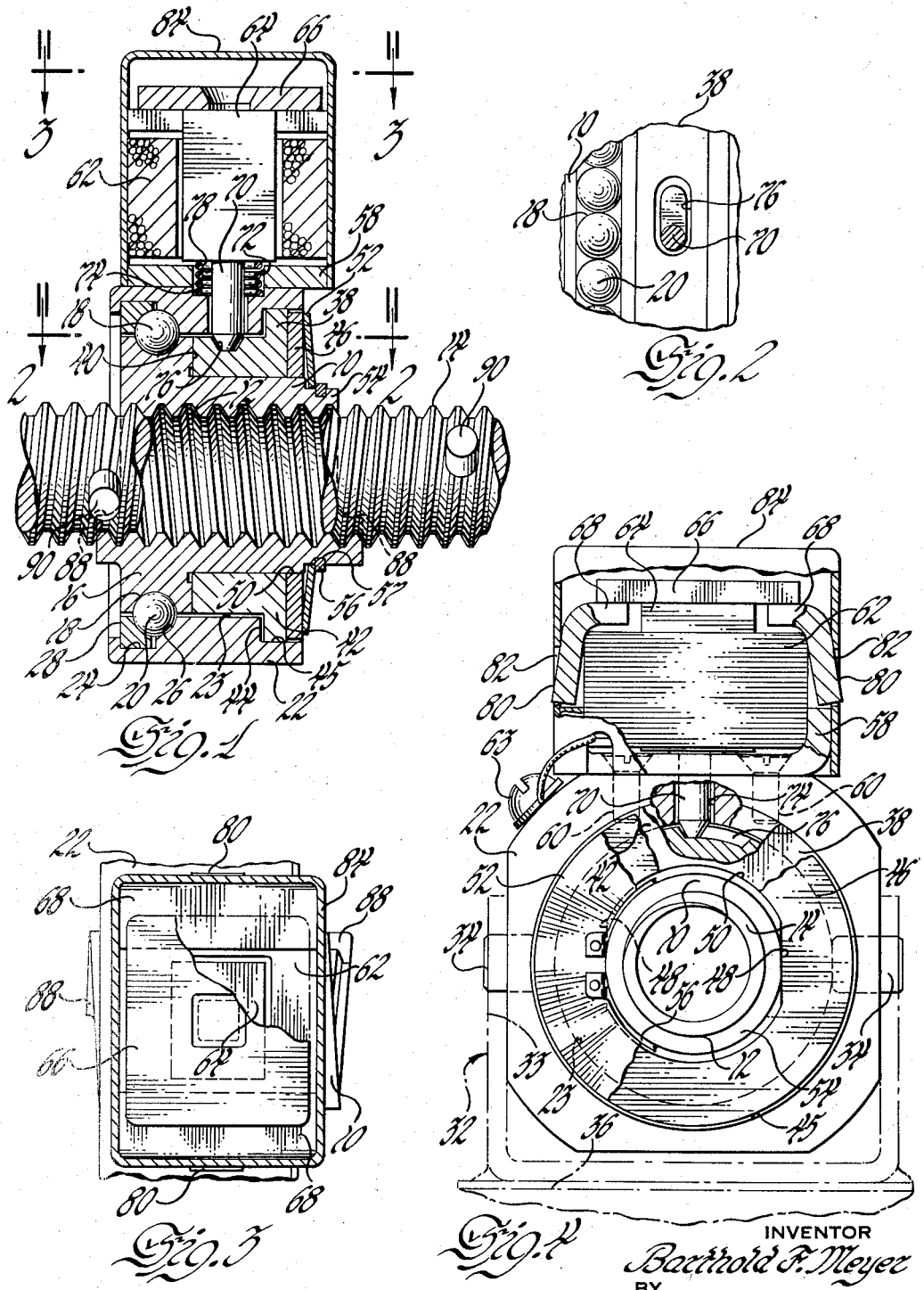
INVENTOR
Berthold F. Meyer
BY
W. S. Pettigrew
ATTORNEY

# United States Patent Office 2,893,258
Patented July 7, 1959

2,893,258
MECHANICAL MOVEMENT DEVICE

Barthold F. Meyer, St. Clair Beach, Ontario, Canada, assignor to General Motors Corporation, Detroit, Mich., a corporation of Delaware Application November 16, 1956, Serial No. 622,565

15 Claims. (Cl. 74—424.8)

This invention relates to mechanical movement devices and more particularly to screw and nut actuators.

The screw and nut actuator of this invention is of the type including a helically threaded lead screw and a nut threadedly receiving the lead screw and selectively brakeable to a non-rotatable member so as to prevent the nut from rotating with the lead screw and thereby cause the nut and lead screw to move axially with respect to each other. Screw and nut actuators of this type have many uses and are often used in power operated seat adjuster structures.

In many present actuators, the nut is rotatably received within a non-rotatable housing and a solenoid actuated plunger supported by the housing is selectively operable to impositively engage within a circumferential groove in the nut to brake the nut to the housing. This prevents the nut from rotating with the lead screw and causes the nut and housing to move axially with respect to the lead screw to operate a member. When the nut encounters a torque overload or an obstruction, the nut will rotate with the lead screw and will cam the plunger out of engagement from within the groove during each revolution of the nut with the lead screw until the plunger is retracted from engagement within the groove. This results in a clicking noise which is objectionable and also results in undue wear of the nut and plunger.

The screw and nut actuator of this invention operates in a very smooth and quiet manner and no noise is produced when the nut reaches its limit of travel or encounters an obstruction. In its preferred embodiment, the nut and non-rotatable housing are interconnected by two braking means rather than by only a single braking means. One of the braking means is of the positive type wherein a solenoid is selectively operable to move a plunger into engagement within a circumferential groove in a brake ring rotatably supported on the nut. The brake ring in turn is braked to the nut by an impositive type friction braking means. This braking means is operable to allow slippage between the brake ring and the nut when the positive type braking means is engaged to allow the nut to rotate with the lead screw without producing any noise whatsoever when the nut encounters an obstruction or torque overload. Thus, no undue wear of the plunger and nut can take place and the actuator operates in a smooth and quiet manner.

The primary object of this invention is to provide an improved screw and nut actuator. Another object of this invention is to provide an improved screw and nut actuator operable in a smooth and quiet manner. A further object of this invention is to provide an improved screw and nut actuator wherein the nut may be selectively braked by positive and impositive type braking means so as to be movable axially relative to a lead screw. Yet, another object of this invention is to provide an improved screw and nut actuator which includes a positive braking means and an impositive braking means cooperatively braking the nut so as to provide for relative axial movement between the nut and lead screw, with the positive and impositive braking means being operable independently of each other.

These and other objects of this invention will be readily apparent from the following specification and drawings, in which:

Figure 1 is a partial axial sectional view of a screw and nut actuator according to this invention;

Figure 2 is a partial sectional view taken on the plane indicated by line 2—2 of Figure 1;

Figure 3 is a sectional view taken on the plane indicated by line 3—3 of Figure 1, with parts thereof broken away for clarity of illustration; and Figure 4 is an axial view of the actuator, with parts thereof broken away for clarity of illustration.

Referring now to the drawing, a nut 10 includes a helically threaded bore 12 which receives a helically threaded lead screw 14 to mechanically interconnect the nut and lead screw by means of friction. The lead screw is rotatably mounted adjacent either end thereof in suitable supports and is driven by suitable power operating means such as an electric motor. A radially extending annular flange 16 of the nut is provided with a continuous peripheral circular groove 18 which provides an inner race for a series of ball bearings 20. A housing 22 having a bore 23 surrounds the nut and is provided with a radially inwardly opening channel 24 adjacent one end thereof. The inner wall of channel 24 is arcuately cut away at 26 to provide one portion of the outer race for ball bearings 20 and the other portion of the outer race is provided by an arcuately cut-away continuous ring 28 which fits within channel 24. The ring is held within channel 24 by the outer wall thereof which is flanged over after assembly. Thus, the ball bearings 20 rotatably support one end of the nut within housing 22.

The housing 22 is non-rotatable and may either be stationary or may move axially with respect to the lead screw 14 upon relative rotational movement between the nut and lead screw. If the lead screw 14 is stationary, although rotatable, the housing 22 may be connected in a suitable manner to a member to be operated so that movement of the housing and nut axially of the lead screw 14 will result in operation of the member. Alternately the nut and housing may be stationary and the lead screw 14 may be move axially with respect thereto upon relative rotational movement therebetween to operate the member which is connected thereto in a suitable manner. As shown schematically in Figure 4, the housing 22 may be mounted on a fixed support 32 such that the lead screw 14 will move axially relative to the nut and housing upon relative rotational movement therebetween. As shown in Figure 4, a pair of trunnions 34 may be fixed to alternate sides of housing 22 and may be rotatably mounted in the opposite legs of a U-shaped bracket 33 which may be fixed in a suitable manner to a fixed member 36.

A brake ring 38 is rotatably mounted on nut 10 and has the inner end 40 thereof bearing against the inner wall of the annular flange 16 to locate the ring. An annular flange 42 of the brake ring is received within an outwardly opening groove 44 in housing 22 and rotatably bears against the base wall 45 of the groove in order to rotatably support the other end of the nut 10 within housing 22. A brake disk 46 is slidably and non-rotatably mounted on nut 10 and bears against the outer end wall of the brake ring 38 including flange 42.

Referring now particularly to Figure 4, nut 10 is provided with a pair of opposing flat sides 48. The brake disk 46 in turn is provided with a central opening 50 of substantially the shape of this portion of the nut 10 so as to slidably but non-rotatably mount the disk on the nut. A Belleville spring washer 52 fits on a reduced annular portion 54 of the nut and is held in engagement with disk 46 by a split ring 56 which fits within a groove 57 in portion 54. The brake disk 46 in turn holds the inner end 40 of brake ring 38 in engagement with the flange 16 of nut 10 to provide an impositive brake between the nut and brake ring 38.

Referring now particularly to Figure 4, a generally U-shaped bracket 58 is secured to the upper wall of housing 22 by means of screws 60 which are threaded in suitable bores of the housing. A solenoid coil 62 fits within bracket 58 and is grounded to housing 22 at 63. The armature 64 of the solenoid is provided with a flat head 66 which is engageable with opposite inwardly extending portions 68 of bracket 58, as shown, in order to provide a stop limiting inward movement of the armature upon energization of the solenoid coil. The armature of the solenoid is further provided with a plunger 70 fixed thereto in a suitable manner and adapted to extend through an opening 72 in bracket 58 and a shouldered opening 74 in the upper wall of housing 22 into engagement with a circumferentially extending groove 76 in brake ring 38. Thus, the solenoid coil and armature and plunger 70 provide a positive brake which is operative to brake the brake ring 38 to housing 22. A spring 78 fitting within openings 72 and 74 engages the armature 64 so as to bias the armature upwardly to a normal or ineffective position wherein plunger 70 is out of engagement with the circumferentially extending groove 76 of the brake ring 38, when the solenoid coil is deenergized. A portion 80 of each of the side walls of bracket 58 is lanced outwardly and is adapted to fit within openings 82 in opposite side walls of a cover 84 so as to mount the cover on the nut and provide a seal for the solenoid coil and armature to prevent the entry of dust and dirt.

Referring now particularly to Figure 1 of the drawings, it will be noted that opposite ends of the nut 10 are provided with axially extending and circumferentially facing shoulders 88 which are adapted to engage pins 90 fixed to the lead screw 14 to either side of nut 10 so as to limit the axial travel of the nut relative to the lead screw, as will be described.

It will be understood that a suitable control circuit interconnects the solenoid coil 62 and the electric motor or other power operating means which drives lead screw 14 so as to provide for simultaneous energization of the solenoid coil and rotation of the lead screw when it is desired to move the nut and housing in a particular axial direction relative to the lead screw.

Referring now to Figures 1 and 4 of the drawings, the operation of the lead screw and nut will be described and it will be assumed that the nut and housing move axially of the lead screw and operate the member to be operated. In the normal or ineffective position of plunger 70 when solenoid coil 62 is deenergized, the plunger is out of engagement with the circumferential groove 76 of the brake ring 38 so that there is no positive engagement between the housing 22 and the nut 10. Thus, if the lead screw were rotated, the nut would rotate in place with the lead screw due to the mechanical and frictional interconnection provided therebetween by the complementary threaded bore 12 of the nut and the threaded periphery 14 of the lead screw. The brake ring 38 would rotate with the nut 10 due to the operation of the impositive brake provided by the brake disk 46 and the Belleville spring washer 52, both of which will also rotate with the nut. If it is desired to move the nut axially relative to the lead screw 14, the solenoid coil 62 is energized so as to move the solenoid armature 64 inwardly within the coil and in turn move plunger 70 into engagement with the circumferential groove 76 of the brake ring 38, as shown in Figures 1 and 4.

In this position of plunger 70, the brake ring 38 is positively braked to the housing 22 so that the brake ring cannot rotate with the nut 10. In turn, the brake ring is braked to the nut 10 by means of the impositive brake so that the nut is braked to the housing 22 and cannot rotate with the lead screw. Thus, the positive and impositive brakes cooperate to brake the ring 38 to housing 22 and nut 10 so that rotation of the lead screw will move the nut axially along the lead screw in either direction depending upon the direction of rotation of the lead screw.

Should the nut encounter a torque overload placed thereon by means of the member being operated, the impositive brake will allow slippage between the ring 38 and the disk 46 such that the nut 10, disk 46, and Belleville spring washer 52 will rotate in place with the lead screw so as to stop axial movement of the nut, with the positive brake remaining energized to brake ring 38 to housing 22 so that the ring is stationary.

Should either shoulder 88 of the nut engage one of the pins 90 on the lead screw as the nut moves axially along the lead screw, the nut will be clutched to the lead screw, as shown in Figure 1, so as to rotate therewith with the impositive brake again allowing slippage between the disk 46 and ring 38, with the positive brake remaining energized. Thus, it can be seen that whenever the positive brake provided by the solenoid coil and armature and plunger 70 is energized so as to interconnect the ring 38 and the housing 22, the impositive brake provided by disk 46 and Belleville spring washer 52 will allow slippage between the ring and the nut upon the occurrence of certain conditions so as to disengage the nut from the ring and allow the nut to rotate in place with the lead screw 14. The arrangement is such as to result in a smooth and quiet manner of operation.

If the nut and housing are stationary and the lead screw moves axially relative thereto and operates the member to be operated, the operation will remain the same should either shoulder 88 of the nut engage one of the pins 90 on the lead screw as the lead screw moves axially relative to the nut. However, should a torque overload be placed on the lead screw by the member being operated, the impositive brake will not allow slippage between the nut and lead screw since the lead screw itself will not rotate and the power operating means may stall.

It should also be noted that the screw and nut actuator of this invention is equally applicable wherein the nut is driven by the power operating means so as to move axially along the lead screw which is stationary and non-rotatable. In this type of actuator the member to be operated is connected to the nut or housing.

Thus, this invention provides an improved screw and nut actuator which includes a positive brake and an impositive brake cooperatively interconnecting the nut and the non-rotatable housing so as to allow disconnection of the nut from the housing without deenergization of the positive brake should the nut strike an obstruction or encounter a torque overload during operation of the actuator. The positive brake is selectively operable independently of the impositive brake and likewise the impositive brake is operable independently of the positive brake so that each brake may be disengaged independently of the other to disconnect the nut from the non-rotatable housing and prevent relative axial movement of the nut and lead screw.

What is claimed is:

1. A mechanical movement device comprising, first and second rotatable members, means interconnecting said members for axial movement of said first member relative to said second member upon relative rotational movement therebetween, a non-rotatable member, and first and second means cooperatively interconnecting said non-rotatable member and said first member to secure said first member against rotation for axial movement thereof relative to said second member upon rotation thereof, said first and second means being disengageable independently of each other to release said first member against rotation and thereby prevent axial movement thereof.

2. A mechanical movement device comprising, first and second rotatable members, means interconnecting said members for axial movement of said first member relative to said second member upon relative rotational movement therebetween, a non-rotatable member, and first and second brake means cooperatively interconnecting said non-rotatable member and said first member to secure said first member against rotation for axial movement thereof relative to said second member upon rotation thereof, said first brake means being selectively disengageable independently of said second brake means to release said first member against rotation and thereby prevent axial movement thereof, and said second brake means being disengageable independently of said first brake means to release said first member against rotation upon predetermined torque overload and thereby prevent axial movement thereof.

3. A mechanical movement device comprising, first and second rotatable members, means interconnecting said members for axial movement of said first member relative to said second member upon relative rotational movement therebetween, a non-rotatable member, and first and second brake means operable to cooperatively interconnect said non-rotatable member and said first member to secure said first member against rotation for axial movement thereof relative to said second member upon rotation thereof, said first brake means being selectively and alternately engageable and disengageable independently of said second brake means to selectively and alternately secure said first member against rotation for axial movement thereof or to release said first member against rotation and prevent axial movement thereof.

4. A mechanical movement device comprising, first and second rotatable members, means interconnecting said members for axial movement of said first member relative to said second member upon relative rotational movement therebetween, a non-rotatable member, and first and second brake means operable to cooperatively interconnect said non-rotatable member and said first member to secure said first member against rotation for axial movement thereof relative to said second member upon rotation thereof, said first brake means being selectively and alternately engageable and disengageable independently of said second brake means to selectively and alternately secure said first member against rotation for axial movement thereof or to release said first member against rotation and prevent axial movement thereof, said second brake means being disengageable independently of said first brake means to release said first member against rotation only upon predetermined torque overload and thereby prevent axial movement thereof.

5. A mechanical movement device comprising, first and second rotatable members, means interconnecting said members for axial movement of said first member relative to said second member upon relative rotational movement therebetween, a non-rotatable member, first and second brake means cooperatively interconnecting said non-rotatable member and said first member to secure said first member against rotation for axial movement thereof relative to said second member upon rotation thereof, said second brake means being disengageable independently of said first brake means to release said first member against rotation upon predetermined torque overload and thereby prevent axial movement thereof, and means on said second member engageable by said first member upon axial movement thereof within predetermined limits of travel to apply a torque overload sufficient to disengage said second brake means to release said first member against rotation and thereby prevent axial movement of said first member.

6. A mechanical movement device comprising, first and second rotatable members, means interconnecting said members for axial movement of said first member relative to said second member upon relative rotational movement therebetween, a non-rotatable member, first and second brake means cooperatively interconnecting said non-rotatable member and said first member to secure said first member against rotation for axial movement thereof relative to said second member upon rotation thereof, said second brake means being disengageable independently of said first brake means to release said first member against rotation upon predetermined torque overload to thereby prevent axial movement thereof, and means on said second member engageable by said first member upon axial movement thereof within predetermined limits of travel to brake said second member to said first member for simultaneous rotational movement thereof and to thereby apply a torque overload sufficient to disengage said second brake means.

7. A mechanical movement device comprising, first and second rotatable members, means interconnecting said members for axial movement of said first member relative to said second member upon relative rotational movement therebetween, a non-rotatable member, a brake member rotatably supported by said first member, positive braking means for securing said brake member to said non-rotatable member, and impositive braking means for securing said brake member to said first member whereby said first and second braking means cooperatively brake said first member to said non-rotatable member.

8. A mechanical movement device comprising, first and second rotatable members, means interconnecting said member for axial movement of said first member relative to said second member upon relative rotational movement therebetween, a non-rotatable member, a brake member rotatably supported by said first member, positive braking means for securing said brake member to said non-rotatable member, and impositive braking means for securing said brake member to said first member whereby said first and second braking means cooperatively brake said first member to said non-rotatable member, said second braking means being releasable independently of said first braking means upon a torque overload to thereby release said first member from said non-rotatable member for rotation with said second member.

9. A mechanical movement device comprising, first and second rotatable members, means interconnecting said members for axial movement of said first member relative to said second member upon relative rotational movement therebetween, a non-rotatable member, a brake member rotatably supported by said first member, selectively operable braking means operatively engageable with said brake member for securing said member to said non-rotatable member, and impositive braking means securing said brake member to said first member whereby said first and second braking means cooperatively secure said first member against rotation for axial movement relative to said second member upon relative rotational movement therebetween, said positive braking means being disengageable independently of said impositive braking means to thereby release said first member for rotation with said second member upon rotational movement thereof.

10. A mechanical movement device comprising, a lead screw, a nut threadedly mounted on said lead screw for axial movement therealong upon relative rotational movement therebetween, a non-rotatable member rotatably supported by said nut, a brake member rotatably supported by said nut, selectively operable braking means supported by said non-rotatable member and positively engageable with said brake member for braking said brake member to said non-rotatable member, impositive braking means supported by said nut and engageable with said brake member for braking said nut to said brake member to thereby cooperate with said positive braking means to secure said nut against rotation, and means for selectively operating said positive braking means independently of operation of said impositive braking means.

11. A mechanical movement device comprising, a lead screw, a nut threadedly mounted on said lead screw for axial movement therealong upon relative rotational movement therebetween, a non-rotatable housing, means rotatably supporting said housing on said nut adjacent one end thereof, a brake member rotatably mounted on said nut for supporting said housing thereon adjacent the other end thereof, selectively operable braking means on said housing engageable with said brake member to thereby brake said brake member to said housing, and impositive braking means mounted on said nut adjacent said other end thereof and engageable with said brake member to secure said brake member to said nut whereby said first and second braking means cooperatively secure said nut to said housing for axial movement along said lead screw upon rotational movement thereof.

12. A mechanical movement device comprising, a lead screw, a nut threadedly mounted on said lead screw, a non-rotatable housing rotatably supported on said nut, a brake member rotatably supported on said nut and having a depression therein at the outer surface thereof, a power operated plunger supported by said housing and engageable within said depression to thereby secure said brake member to said housing, and an impositive friction type brake mounted on said nut and including a braking disk axially movable relative thereto and spring means for moving said disk axially into engagement with said brake member to thereby secure said nut to said brake member for axial movement of said nut along said lead screw upon rotation thereof.

13. A mechanical movement device comprising, first and second rotatable members, means interconnecting said members for axial movement of said first member relative to said second member upon relative rotational movement therebetween, a non-rotatable member, friction brake means normally interconnecting said first member and said non-rotatable member to secure said first member against rotation for axial movement relative to said second member upon rotation thereof, spaced stop means on said second member limiting the distance of axial travel of said first member relative thereto, and means on said first member engageable with said spaced stop means when said first member has reached its limit of axial travel relative to said second member to cause said first member to rotate with said second member and effect release of said friction brake means.

14. A mechanical movement device comprising, nut and lead screw members, means interconnecting said members for axial movement of said nut member relative to said lead screw member upon relative rotational movement therebetween, a non-rotatable member, friction brake means normally interconnecting said nut member and said non-rotatable member to secure said nut member against rotation for axial movement relative to said lead screw member upon rotation thereof, stop means on said lead screw member spaced to one side of said nut member for limiting the distance of axial travel of said nut member relative thereto, and shoulder means on said nut member engageable with said stop means when said nut member has reached its limit of axial travel relative to said lead screw member to cause said nut member to rotate with said lead screw member and effect release of said friction brake means.

15. A mechanical movement device comprising, nut and lead screw members, means interconnecting said members for axial movement of said nut member relative to said lead screw member upon relative rotational movement therebetween, a member adapted to be held against rotation and including a friction bearing surface, a friction brake member secured to said nut member and normally engageable with said friction bearing surface to secure said nut member against rotation for axial movement relative to said lead screw member upon rotation thereof, radially extending stop means on said lead screw member limiting the distance of axial travel of said nut member relative thereto, and axially extending shoulder means on said nut member engageable with said stop means when said nut member has reached its limit of axial travel relative to said lead screw member to cause said nut member to rotate with said lead screw member and to effect release of said friction brake member.

References Cited in the file of this patent

UNITED STATES PATENTS

| | | |
|---|---|---|
| 1,276,811 | Ragan | Aug. 27, 1918 |
| 1,795,420 | Beall | Mar. 10, 1931 |
| 2,602,664 | Matchett | July 8, 1952 |
| 2,660,281 | Ochtman | Nov. 24, 1953 |
| 2,685,949 | Dunlap | Aug. 10, 1954 |
| 2,701,478 | Riess | Feb. 8, 1955 |